United States Patent
Bregazzi et al.

(10) Patent No.: US 9,835,256 B2
(45) Date of Patent: Dec. 5, 2017

(54) SELF-ALIGNING VALVE SEAL

(71) Applicant: Swagelok Company, Solon, OH (US)

(72) Inventors: Charles Kneen Bregazzi, Lower Foxdale (IM); Barry Irvine, Jurby (IM); Graham H. Stephenson, Port Erin (IM)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 14/934,285

(22) Filed: Nov. 6, 2015

(65) Prior Publication Data

US 2016/0131264 A1   May 12, 2016

Related U.S. Application Data (60) Provisional application No. 62/076,710, filed on Nov. 7, 2014.

(51) Int. Cl.
| | |
|---|---|
| *F16K 1/38* | (2006.01) |
| *F16K 1/34* | (2006.01) |
| *F16K 1/42* | (2006.01) |

(52) U.S. Cl.
CPC .............. *F16K 1/34* (2013.01); *F16K 1/38* (2013.01); *F16K 1/42* (2013.01)

(58) Field of Classification Search
CPC ..... F16K 1/34; F16K 1/38; F16K 1/42; F16K 1/385
USPC .................................................. 251/84, 85
See application file for complete search history.

(56) References Cited

U.S. PATENT DOCUMENTS

| | | | |
|---|---|---|---|
| 788,079 | A | 4/1905 | Wheeler |
| 2,152,784 | A | 4/1939 | Birrell |
| 2,386,003 | A | 10/1945 | Peck |
| 2,506,872 | A * | 5/1950 | Huthsing ........... A62C 99/0027 251/85 |
| 2,573,623 | A * | 10/1951 | Stover ...................... F16K 1/36 251/85 |
| 2,713,986 | A | 7/1955 | Suthann |
| 2,840,336 | A | 6/1958 | Suthann |
| 2,973,778 | A | 3/1961 | Baker |
| 3,099,432 | A | 7/1963 | Zeitlin |
| 3,155,367 | A * | 11/1964 | Gifford .................... F02M 1/00 251/357 |
| 3,179,310 | A | 4/1965 | Steiman |

(Continued)

OTHER PUBLICATIONS

Pressure Regulators RHPS Series, Swagelok Company, 76 pp., Jan. 2016.

(Continued)

*Primary Examiner* — William McCalister
(74) *Attorney, Agent, or Firm* — Calfee, Halter Griswold LLP (57) ABSTRACT

A valve includes a valve body, a valve seat, and a poppet assembled with the valve body. The poppet includes an axially extending poppet stem and a radially extending poppet sealing surface. The poppet is axially movable between a closed position and an open position. The poppet sealing surface is defined by a sealing member disposed on the poppet stem. The sealing member is laterally movable on the poppet stem. When the poppet is moved from the open position to the closed position, the sealing member is laterally moved to align the sealing surface with the seating surface.

16 Claims, 8 Drawing Sheets

(56) References Cited

U.S. PATENT DOCUMENTS

| | | | |
|---|---|---|---|
| 3,272,474 A * | 9/1966 | Pro | B65D 90/582 251/144 |
| 3,275,290 A | 9/1966 | Siver | |
| 3,385,561 A | 5/1968 | Whalen | |
| 3,412,756 A | 11/1968 | Shore | |
| 3,727,880 A * | 4/1973 | Stock | F16K 1/2028 137/72 |
| 3,820,755 A * | 6/1974 | Greenwood et al. | F16K 1/48 251/85 |
| 3,829,105 A | 8/1974 | Kammeraad | |
| 3,955,597 A | 5/1976 | Oneyama et al. | |
| 4,013,197 A | 3/1977 | Ewald | |
| 4,138,090 A | 2/1979 | Summer et al. | |
| 4,318,532 A | 3/1982 | Winkler | |
| 4,332,368 A | 6/1982 | Woloszeczuk | |
| 4,351,285 A | 9/1982 | Bradshaw | |
| 4,442,959 A | 4/1984 | Del Bon et al. | |
| 4,450,859 A * | 5/1984 | Bergman | F16K 1/36 137/516.29 |
| 4,513,946 A | 4/1985 | Priese | |
| 4,531,532 A | 7/1985 | Zimmerly | |
| 4,725,040 A | 2/1988 | Fornuto et al. | |
| 4,811,703 A | 3/1989 | Rericha et al. | |
| 4,811,960 A | 3/1989 | Stritzke et al. | |
| 4,842,016 A * | 6/1989 | McKenzie | F16K 11/044 137/597 |
| 5,110,142 A | 5/1992 | Szott | |
| 5,113,898 A | 5/1992 | White et al. | |
| 5,205,535 A | 4/1993 | Nevrekar | |
| 5,419,531 A | 5/1995 | Hoehn | |
| 5,996,966 A | 12/1999 | Zimmerly | |
| 6,029,948 A | 2/2000 | Shafer | |
| 6,035,888 A | 3/2000 | Gil | |
| 7,931,251 B2 | 4/2011 | Partridge | |
| 8,496,226 B2 | 7/2013 | Dalluge et al. | |
| 8,720,854 B2 | 5/2014 | Dalluge et al. | |
| 8,936,231 B2 | 1/2015 | McCoy et al. | |
| 2011/0315251 A1 | 12/2011 | Rampen et al. | |

OTHER PUBLICATIONS

International Search Report and Written Opinion from PCT/US15/59401 dated Jan. 28, 2016.

* cited by examiner

SELF-ALIGNING VALVE SEAL

CROSS-REFERENCE TO RELATED APPLICATION

This application claims priority to and all benefit of U.S. Provisional Patent Application Ser. No. 62/076,710, filed on Nov. 7, 2014, for SELF-ALIGNING VALVE SEAL, the entire disclosure of which is fully incorporated herein by reference.

TECHNICAL FIELD OF THE INVENTIONS

The inventions relate to fluid flow and delivery devices and methods, and more particularly to poppet valves used to control fluid flow and delivery.

BACKGROUND OF THE INVENTIONS

Poppet style valves are well known for use as flow control mechanisms for gas and liquid fluid delivery, flow control, and pressure control. Poppet valve arrangements include an axially movable stem having an enlarged disc or head portion that seals against an annular seat in a valve passage when the stem is in a closed position and axially separates from the seat when the stem is in an open position, to permit fluid flow through the valve passage. Many different types of fluid control devices utilize poppet valve mechanisms, including, for example, diaphragm valves, bellows valves, and pressure regulators.

SUMMARY OF THE INVENTIONS

A first inventive concept presented herein provides a poppet type valve arrangement having a laterally movable sealing member for self-alignment of a poppet sealing surface with a seating surface of a valve seat as the poppet is axially moved with respect to the valve seat from an open position to a closed position. In one such embodiment, the laterally movable sealing member is a poppet sealing member assembled with an axially moveable poppet, for self-aligning sealing engagement of the poppet sealing member with an annular valve seat.

Accordingly, in an exemplary embodiment, a valve includes a valve body, a valve seat, and a poppet assembled with the valve body. The poppet includes an axially extending poppet stem and a radially extending poppet sealing surface. The poppet is axially movable between a closed position and an open position. The poppet sealing surface is defined by a sealing member disposed on the poppet stem. The sealing member is laterally movable on the poppet stem. When the poppet is moved from the open position to the closed position, the sealing member is laterally moved to align the sealing surface with the seating surface.

In another exemplary embodiment, a valve includes a valve body, a valve seat surrounding an axially extending portion of a flow path through the valve body, and a poppet assembled with the valve body. The poppet includes upper and lower portions laterally fixed in the valve body, and a radially extending poppet sealing surface disposed on a central portion of the poppet between the laterally fixed upper and lower portions. The poppet is axially movable between a closed position in which the poppet sealing surface seals against a seating surface of the valve seat, and an open position in which the poppet sealing surface axially separates from the seating surface of the valve seat. The poppet sealing surface is defined by a sealing member disposed on the poppet stem. At least one of the poppet sealing member and the valve seat is laterally movable with respect to the other of the poppet sealing member and the valve seat, such that when the poppet is moved from the open position to the closed position, the poppet sealing member and/or the valve seat is laterally moved to align the poppet sealing surface with the valve seating surface.

In another exemplary embodiment, a pressure regulator includes a body, a valve seat surrounding an axially extending portion of a flow path of the body, a poppet assembled with the valve body, a poppet driving mechanism assembled with the poppet stem, and a biasing mechanism. The poppet includes an axially extending poppet stem and a radially extending poppet sealing surface. The poppet is axially movable between a closed position in which the poppet sealing surface seals against a seating surface of the valve seat and an open position in which the poppet sealing surface axially separates from the valve seat. The biasing mechanism applies a biasing force to an upper surface of the poppet driving mechanism to bias the poppet toward one of the open and closed positions. The poppet driving mechanism is configured to be biased toward the other of the open and closed positions by fluid pressure applied to a lower surface of the poppet driving mechanism. The poppet sealing surface is defined by a sealing member disposed on the poppet stem. The sealing member is laterally movable on the poppet stem, wherein when the poppet is moved from the open position to the closed position, the sealing member is laterally moved to align the sealing surface with the seating surface.

In another exemplary embodiment, a poppet subassembly for a valve includes a poppet stem extending in an axial direction and including a neck portion extending axially between enlarged upper and lower portions of the poppet, and an annular poppet sealing member disposed around the neck portion and captured between the enlarged upper and lower portions of the poppet. The annular poppet sealing member has an inner diameter sized to permit lateral movement of the poppet sealing member with respect to the neck portion between a centered position defining a concentric radial gap between the poppet stem neck portion and the poppet sealing member, and an off-center position defining an eccentric radial gap between the poppet stem neck portion and the poppet sealing member.

These and other inventive concepts are fully disclosed hereinbelow, and will be readily understood by those skilled in the art from the following detailed description of the exemplary embodiments in view of the accompanying drawings.

DESCRIPTION OF EXEMPLARY EMBODIMENTS

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while the specific embodiments described herein relate to diaphragm sealed pressure-reducing regulator valve arrangements, the features of the present application may additionally or alternatively be applied to other types of valves, including, for example, back-pressure regulator valve arrangements, shutoff valves, check valves, and relief valves, and other sealing mechanisms, including, for example, bellows sealing and o-ring/gasket sealing arrangements. The terms "poppet valve" and "poppet type valve," as used herein, are intended to broadly include any valve that includes a stem that carries a sealing member that is brought into sealing engagement with an annular seat by longitudinal movement of the stem. The terms "seal" and "sealing engagement" are intended to include conditions of reduced flow resulting from contact between a sealing surface and a seating surface, in addition to a leak-tight or fluid-tight seal.

Figure 1:
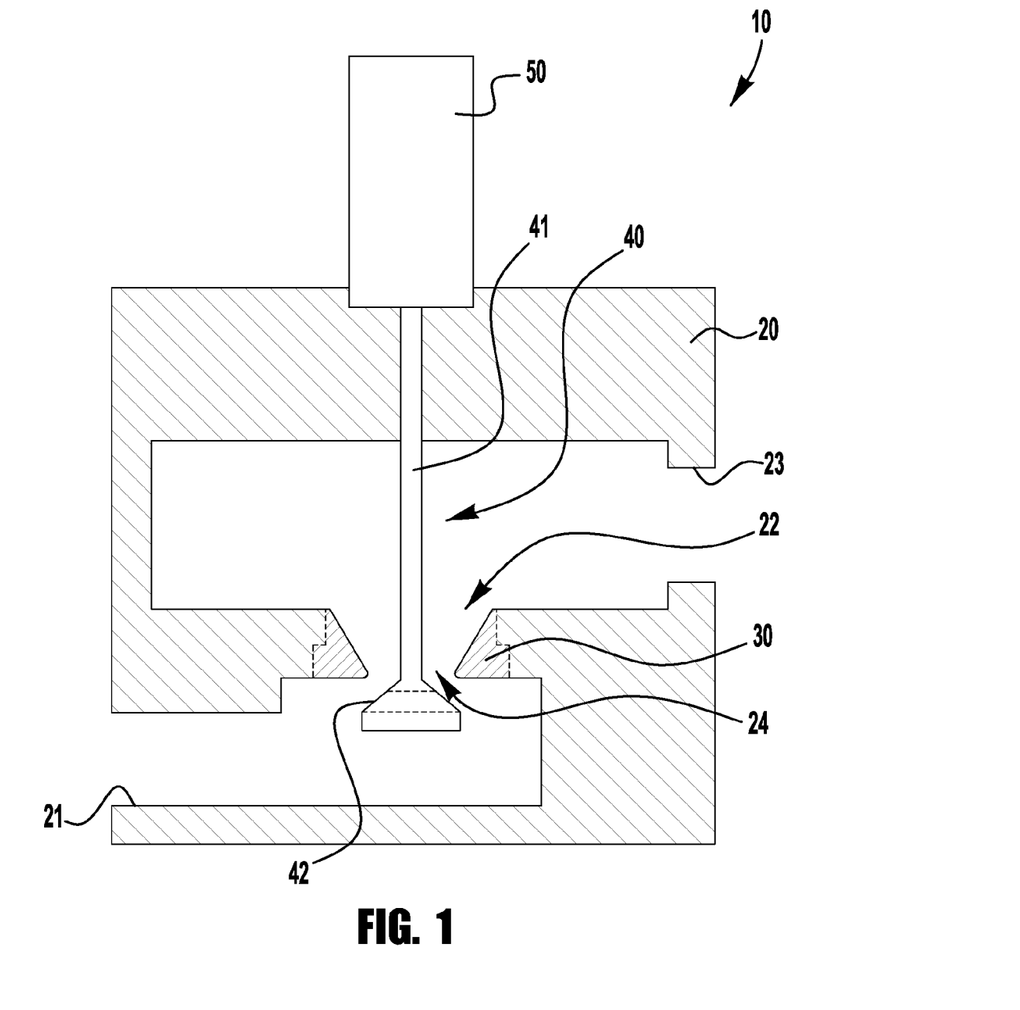
FIG. 1 is a cross-sectional schematic illustration of a poppet type valve assembly, in accordance with an exemplary embodiment of the present application.
Figure 2:
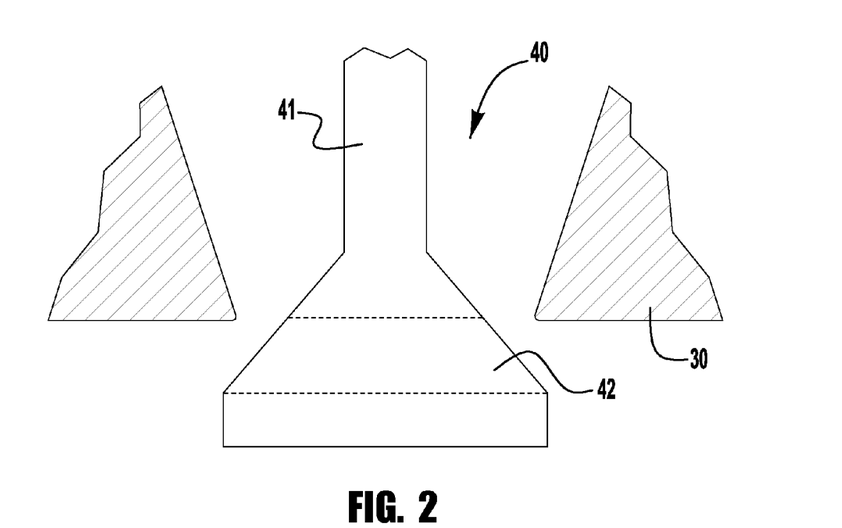
FIG. 2 is an enlarged view of a poppet sealing portion of the poppet type valve assembly of FIG. 1, shown in an open position, with deviations in sealing surface alignment exaggerated to more clearly illustrate the self-aligning properties of the poppet sealing portion.
Figure 3:
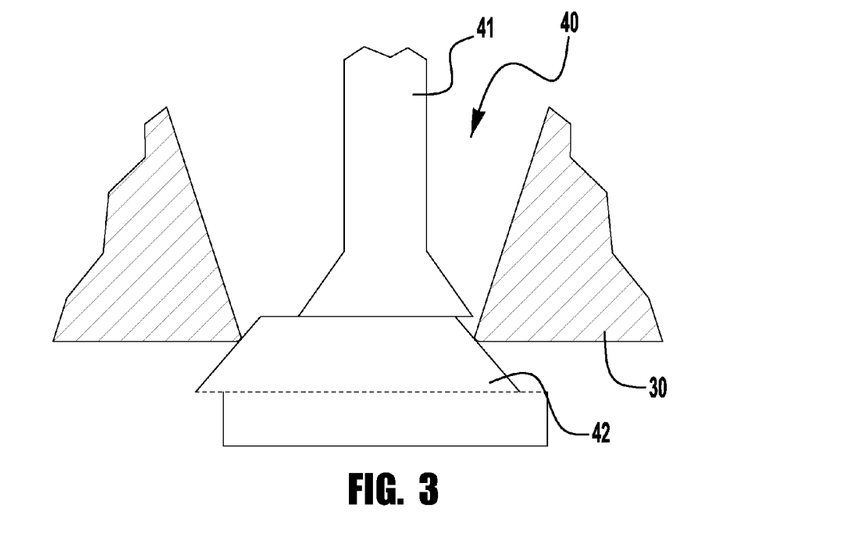
FIG. 3 is an enlarged view of the poppet sealing portion of the poppet type valve assembly of FIG. 1, shown in a closed position, with adjustment of the poppet sealing portion exaggerated to more clearly illustrate the self-aligning properties of the poppet sealing portion.

With reference to FIGS. 1-3, in an exemplary embodiment, a poppet type valve assembly 10 includes a valve body 20 defining a valve passage 22 between inlet and outlet ports 21, 23, and an annular valve seat 30 extending around an axially extending portion 24 of the valve passage. A poppet 40 is assembled with the valve body 20 and includes an axially extending poppet stem 41 and a radially extending poppet sealing portion 42. An actuator 50 is assembled with the poppet stem 41 to control axial movement of the poppet 40 between a closed position, in which the poppet sealing portion 42 seals against the valve seat 30 (e.g., to prevent flow above an allowable leak rate), and an open position, in which the poppet sealing portion axially separates from the valve seat to permit fluid flow through the axially extending portion 24 of the valve passage 22. The actuator 50 may be user operable (e.g., manually, pneumatically, or electrically operable) for selective movement of the poppet 40. Alternatively, the actuator 50 may be configured to automatically move or permit movement of the poppet under certain predetermined system conditions. For example, an actuator arrangement may be configured to cause or permit automatic movement of the poppet 40 at a threshold system fluid pressure, for example, to relieve excess fluid pressure from a system (in the case of a relief valve), to prevent backflow (in the case of a check valve), or to reduce an outlet pressure (in the case of a pressure regulator). Examples of pressure regulators with poppet type valve arrangements are disclosed in a product catalog titled PRESSURE REGULATORS RHPS SERIES, which is publicly available online and otherwise from Swagelok Company, and is fully incorporated herein by reference.

In some valve assemblies, dimensional deviations of any one or more of the valve housing, valve seat, actuator, poppet stem, and poppet sealing portion, as well as any one or more other valve components, may result in misalignment of the poppet sealing portion and the valve seat. This misalignment may cause system fluid leakage past the poppet sealing portion and the valve seat when the poppet is in the closed position. Use of seats and sealing portions of harder materials (e.g., materials having a hardness of at least 90 SHORE D), for example, metals and harder plastics, such as polyetheretherketone (PEEK), for example, in high pressure and/or high temperature applications, may result in greater susceptibility to seat leakage from even minor seat-seal misalignment. Use of narrow or line engagement between the valve seat and poppet sealing portion may also cause greater susceptibility to seat leakage from seat-seal misalignment. Minor leakage, particularly at high pressures, can cause erosion of the sealing surfaces, leading to more significant leakage past the valve seat. Further, in some poppet type valve assemblies, the axially movable poppet is laterally fixed both above and below the sealing portion, which presents additional locations for tolerance stack-up deviations or other such misalignments to cause inadequate sealing engagement between the valve seat and the poppet sealing portion. Additionally, in some valve assemblies, a closing force applied to the poppet stem may be minimal, such that forced deflection or deformation of the seat and sealing portions is insufficient to compensate for sealing surface misalignment.

In accordance with an aspect of the present application, to improve alignment of the valve seat and the poppet sealing portion of a poppet type valve assembly, at least one of the valve seat and the poppet sealing portion may be laterally movable with respect to the other of the valve seat and the poppet sealing portion, for aligning adjustment of the relative lateral positions of the valve seat and the poppet sealing portion. In such an arrangement, contoured surfaces (e.g., chamfered, frustoconical, or other angled seating surfaces) of one or both of the valve seat and the poppet sealing portion may facilitate self-alignment of the valve seat and the poppet sealing portion as the poppet is moved to the closed position, by directing the axial closing force on the poppet in a lateral direction.

In the valve assembly 10 of FIGS. 1-3, the poppet sealing portion 42 is laterally movable on the poppet 40, such that when the poppet is moved from the open position (FIG. 2), in which a radial seat-seal misalignment may exist, to a closed position (FIG. 3), the axial closing force between the valve seat 30 and the poppet 40 is directed against the poppet sealing portion 42 to laterally move the poppet sealing portion for automatic alignment of the poppet sealing portion with the valve seat 30.

Figure 4A:
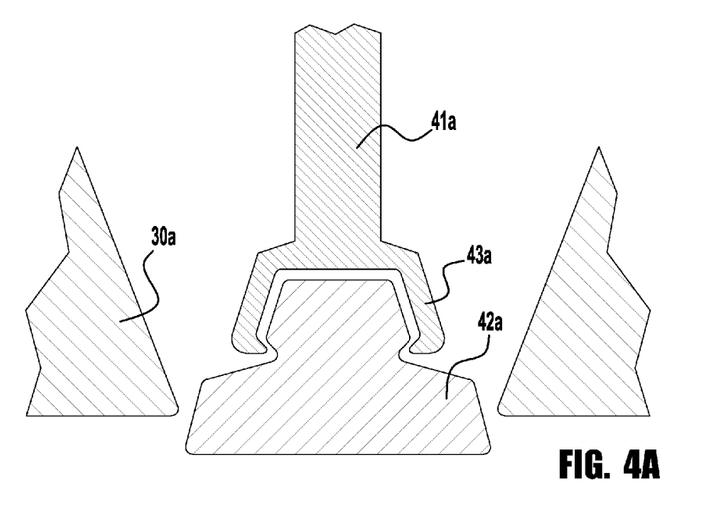
FIG. 4A is a cross-sectional schematic illustration of a poppet sealing arrangement, in accordance with an exemplary embodiment of the present application.
Figure 4B:
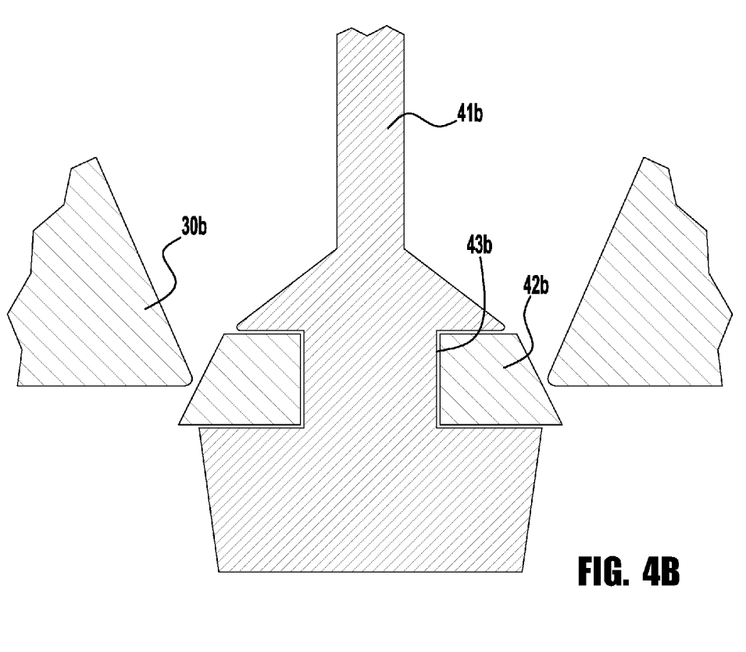
FIG. 4B is a cross-sectional schematic illustration of another poppet sealing arrangement, in accordance with an exemplary embodiment of the present application.

Many different types of laterally movable poppet sealing portions may be utilized, including, for example, a seal disc 42a loosely captured radially by a cuff or collar portion 43a on the poppet stem 41a (see FIG. 4A), or an annular sealing ring 42b disposed around a neck portion 43b of the poppet stem 41b (see FIG. 4B).

Laterally movable seat and/or poppet sealing portions, as described herein, may be utilized in a variety of poppet type valve assemblies, including shutoff valves, switching valves, relief valves, check valves, and regulator valve assemblies. In an exemplary embodiment, a pressure regulator includes a laterally movable poppet sealing portion configured to align with a valve seat when the poppet is moved to the closed position.

Figure 5:
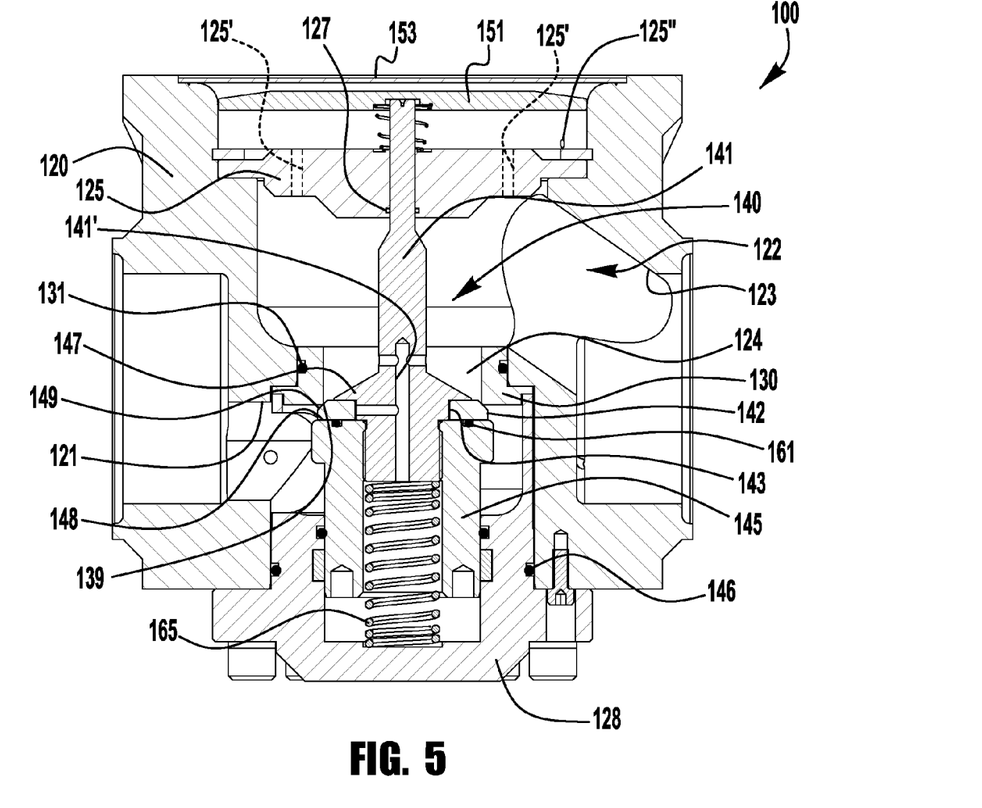
FIG. 5 is a cross-sectional view of a pressure regulator, in accordance with an exemplary embodiment of the present application.
Figure 5A:
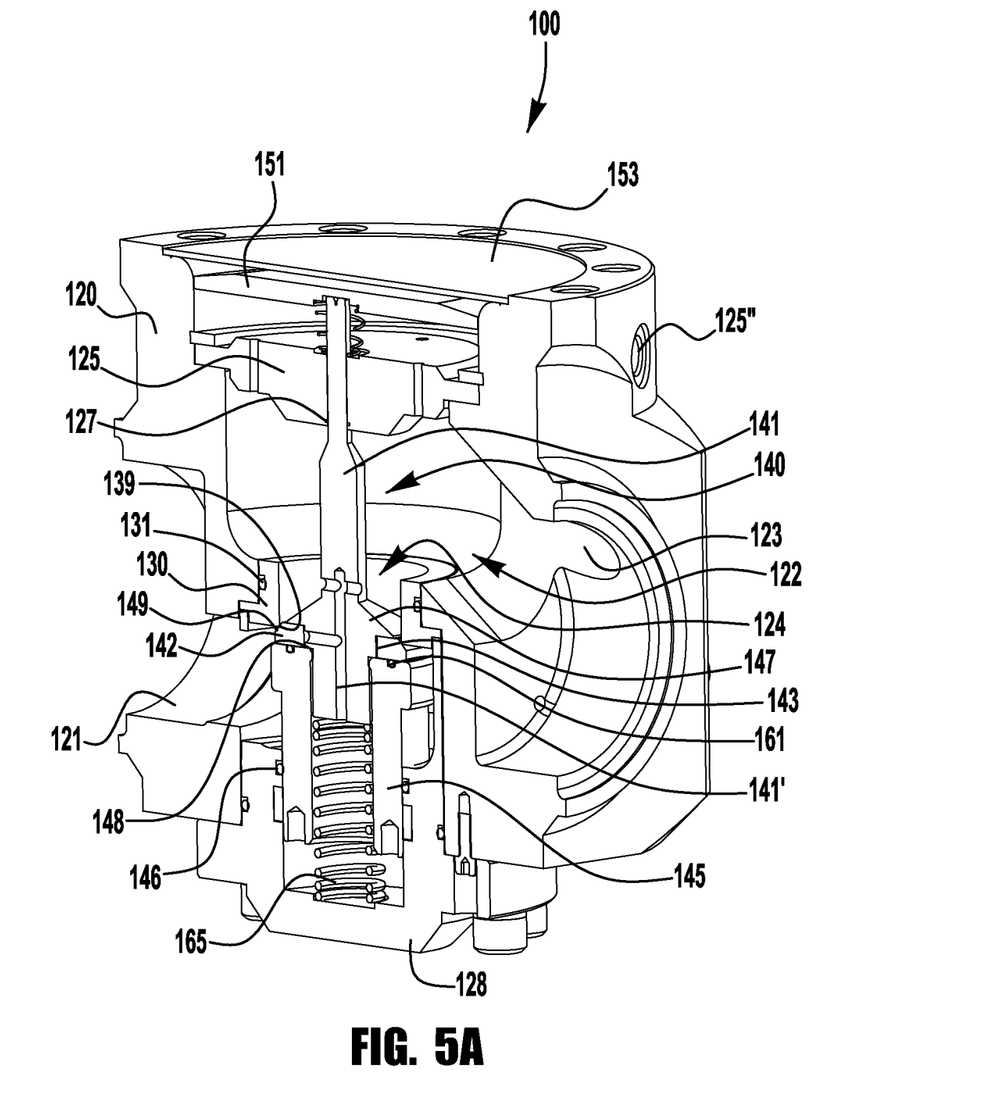
FIG. 5A is a perspective cross-sectional view of the pressure regulator of FIG. 5.
Figure 6:
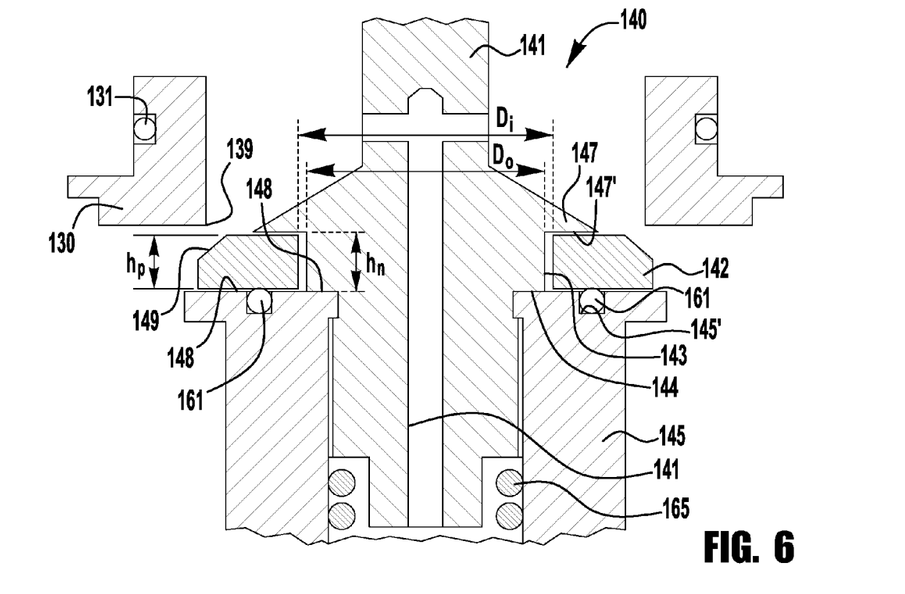
FIG. 6 is an enlarged view of a poppet sealing portion of the pressure regulator of FIG. 5, shown in an open position, with deviations in sealing surface alignment exaggerated to more clearly illustrate the self-aligning properties of the poppet sealing portion.
Figure 7:
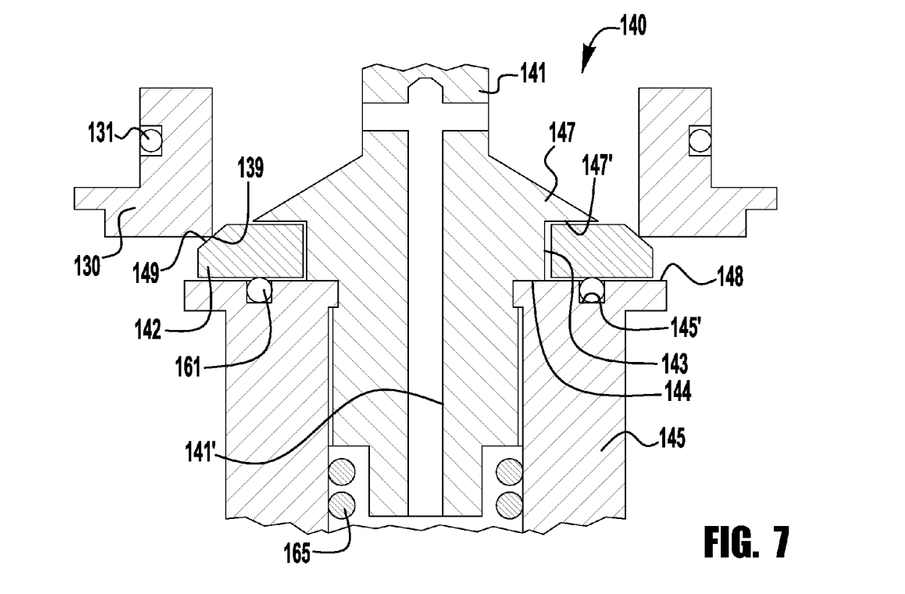
FIG. 7 is an enlarged view of the poppet sealing portion of the pressure regulator of FIG. 5, shown in a closed position, with adjustment of the poppet sealing portion exaggerated to more clearly illustrate the self-aligning properties of the poppet sealing portion.

FIGS. 5-7 illustrate an exemplary pressure regulator 100 including a body 120 defining a passage 122 between inlet and outlet ports 121, 123, and an annular valve seat 130 extending around an axially extending portion 124 of the passage. In the illustrated embodiment, the valve seat 130 is assembled with the body 120, for example, to permit replacement of a worn or damaged valve seat. The valve seat 130 is removable from the body 120 by removal of a plug portion 128 assembled (e.g., threadably assembled) with the body. An o-ring 131 provides a fluid tight seal between the valve seat 130 and the body 120.

A poppet 140 is installed in the body 120 and includes an axially extending poppet stem 141 and a radially extending poppet sealing member 142. As shown, the poppet sealing member may be rotationally symmetrical (i.e., having a continuous circumferential profile), on the inner diameter, on the radially outer surface, or both. In other embodiments (not shown), the poppet sealing member may have a discontinuous circumferential profile (e.g., segmented flanges, fingers, etc.), for example, to facilitate assembly of the poppet sealing member on the poppet. A plate member 151 is assembled with the poppet stem 141 to control axial movement of the poppet 140 between a closed position, in which the poppet sealing member 142 seals against the valve seat 130, and an open position, in which the poppet sealing member axially separates from the valve seat to permit fluid flow through the axially extending portion 124 of the valve passage 122.

To withstand high system pressures (e.g., up to 6000 psi) without significant material flow or erosion, the valve seat and poppet sealing member may be provided in sufficiently hard, wear resistant materials (for example, metal or plastic materials having a hardness of at least 90 SHORE D). For example, the valve seat may be provided in stainless steel and the poppet sealing member may be provided in polyetheretherketone (PEEK).

The regulator 100 is configured to apply a downward opening force to the poppet 140 to maintain the poppet in the open position as long as the outlet system pressure (either within the regulator or downstream of the regulator, as described in greater detail below) does not exceed a predetermined threshold. An actuator (not shown) is assembled with the body 120 and is configured to apply a downward biasing force against a diaphragm 153 assembled with the body 120 above the plate member 151. The downward biasing force may be user adjustable to be set to a force that is equal to or slightly above an upward force applied to the diaphragm 153 by a desired maximum outlet pressure of the regulator 100. When the outlet system pressure is below the predetermined threshold, the downward force of the actuator on the diaphragm 153 causes the diaphragm to flex downward, against the outlet system pressure, to push or move the plate member 151 and poppet 140 downward to an open position. When the outlet pressure forces against the diaphragm 153 are greater than or equal to the downward biasing force applied by the actuator, the outlet pressure acts on the diaphragm to overcome the downward biasing force, pulling or moving the plate member 151 upward for pulling movement of the poppet 140 to the closed position. Where the forces applied to the diaphragm 153 by the outlet system pressure are only slightly greater than the downward biasing force applied by the actuator, the resulting closing forces applied to the poppet 140 are minimal (e.g., a closing force approaching zero), and precise alignment of the valve seat 130 and the poppet sealing member 142 may be required to effect a leak tight seal.

Many different types of actuators may be utilized to apply a selected downward biasing force against the diaphragm. For example, a pressurized dome chamber may be assembled above the diaphragm 153 to apply a downward biasing force set by pressurizing the dome chamber (e.g., with pressurized air) to a user selected pressure corresponding to a required downward biasing force. In another exemplary embodiment, an actuator arrangement may include a compressed spring that applies a downward biasing force (directly or indirectly) to the diaphragm. In one such embodiment, compression of the spring may be adjustable to increase or decrease the downward biasing force exerted by the spring. For example, a spring guide engaging the upper end of the spring may be lowered or raised (e.g., by a rotatable knob or handle) to increase or reduce the compression of the spring. Exemplary dome pressurized and spring loaded actuating arrangements are described in the above incorporated PRESSURE REGULATORS RHPS SERIES catalog. Other types of poppet driving mechanisms may also be used instead of the diaphragm, such as, for example, a gasket sealed piston, as described in the above incorporated PRESSURE REGULATORS RHPS SERIES catalog.

The exemplary poppet 140 includes a poppet stem 141 that extends through a fixed body plate 125 in the regulator body 120 for engagement with the plate member 151, such that the upper portion of the poppet stem 141 is laterally fixed by the body plate 125 (e.g., at o-ring seal 127). Holes 125' may be provided in the body plate 125 to allow the outlet system pressure to pressurize the diaphragm plate 151 and the diaphragm 153. Alternatively, a port 125" may be provided through the body 120 above the body plate 125 for connection with external downstream system pressure, such that the diaphragm 153 is isolated from the outlet pressure in the regulator and senses the external downstream system pressure.

The lower end of the poppet stem 141 is threadably assembled with a poppet base 145 that extends into a plug portion 128 of the regulator body 120, such that the poppet base 145 is laterally fixed by the plug portion 128 (e.g., at o-ring seal 146). The annular poppet sealing member 142 is captured around a neck portion 143 of the poppet stem, between a radially extending or enlarged upper rim portion 147 of the poppet stem 141 and an upper end face 148 of the enlarged lower poppet base portion 145. The poppet sealing member 142 is positioned such that a contoured (e.g., chamfered, radiused, frustoconical, or otherwise angled) outer sealing surface 149 sealingly engages a corresponding sealing or seating surface 139 of the seat 130 (which may also be suitably contoured) when the poppet 140 is in the closed position. The poppet stem 141 includes internal ports 141' which, coupled with the o-ring seal 146, balance the poppet 140 and reduces the area of the poppet on which the inlet pressure acts. A spring 165 compressed between the poppet 140 and the body plug portion 128 applies a closing force to the poppet in the absence of pressurized fluid in the regulator 100.

To allow the poppet sealing member 142 to laterally move on the poppet stem 141 for adjustable alignment with the seat 130 when the poppet 140 is moved to the closed position, the annular poppet sealing member is provided with an inner diameter $D_i$ that exceeds an outer diameter $D_o$ of the poppet stem neck portion 143 by a differential amount sufficient to permit adequate seat-aligning lateral movement of the poppet sealing member 142 (see FIG. 6). As shown, the resulting radial gap between the poppet stem neck portion 143 and the rotationally symmetrical inner diameter of the poppet sealing member extends along an entire axial length of the poppet sealing member, to allow for uniform lateral movement without radial compression or deformation of the poppet sealing member. As a result, when the poppet 140 is moved to the closed position (FIG. 7), axial engagement of the suitably contoured sealing surfaces 139, 149 can laterally move the poppet sealing member 142 to an off-center position (i.e., defining an eccentric radial gap between the poppet stem neck portion 143 and the poppet sealing member 142) up to one half of this differential amount from a centered position of the poppet sealing member (i.e., defining a concentric radial gap between the poppet stem neck portion 143 and the poppet sealing member 142), for aligned sealing engagement between the poppet sealing member and the seat 130. In an exemplary embodiment, a regulator having a valve seat inner diameter of approximately 60 mm has a poppet sealing member 142 with an inner diameter $D_i$ that exceeds an outer diameter $D_o$ of the poppet stem neck portion 143 by a differential amount of approximately 1 mm.

Figure 8:
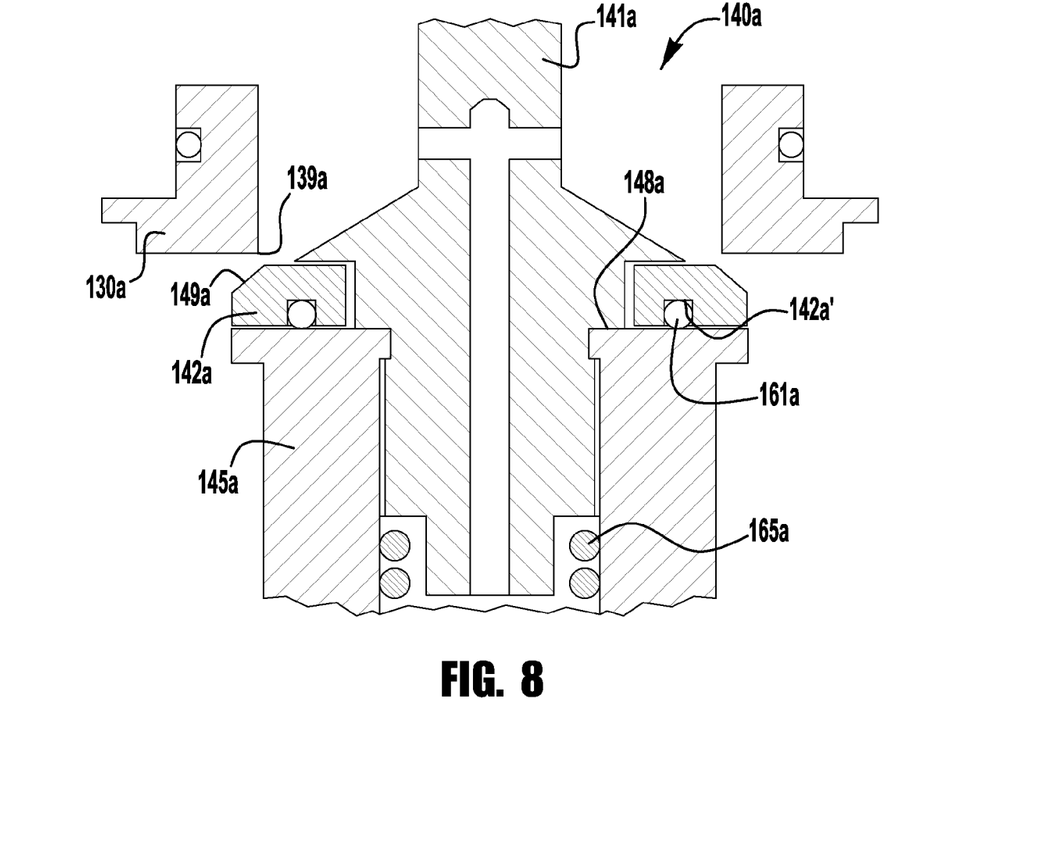
FIG. 8 is an enlarged view of a poppet sealing portion of another pressure regulator, in accordance with another exemplary embodiment of the present application.

To permit lateral movement of the captured poppet sealing member 142, the poppet sealing member may be provided with a height dimension $h_p$ that is slightly smaller than a neck height $h_n$ between a lower surface 147' of the rim portion 147 and the upper end face 148 of the poppet base 145. The neck height $h_n$ may be restricted by a shoulder portion 144 of the poppet stem 141 (FIGS. 6 and 7) against which the upper end face 148 abuts upon full threaded assembly of the poppet base 145 with the poppet stem. This axial gap dimension (e.g., less than 0.5 mm, or approximately 0.3 mm) may also permit the poppet sealing member 142 to tilt on the poppet stem 141 to overcome an angular misalignment between the sealing surfaces 139, 149 of the valve seat 130 and the poppet sealing member 142. To prevent inlet port leakage past the poppet sealing member 142, a flexible annular gasket seal 161 (e.g., an o-ring) may be secured between the poppet sealing member 142 and the poppet base 145. In the illustrated embodiment, the gasket seal 161 is retained in an annular groove 145' in the upper end face 148 of the poppet base 145, with the gasket seal 161 being compressed by and sealing against a lower surface of the poppet sealing member 142. In an alternative embodiment, as shown in FIG. 8, a gasket seal 161a may be retained in an annular groove 142a' in the lower surface of the poppet sealing member 142a, with the gasket seal 161a being compressed by and sealing against the upper end face 148a of the poppet base 145a.

Figure 9:
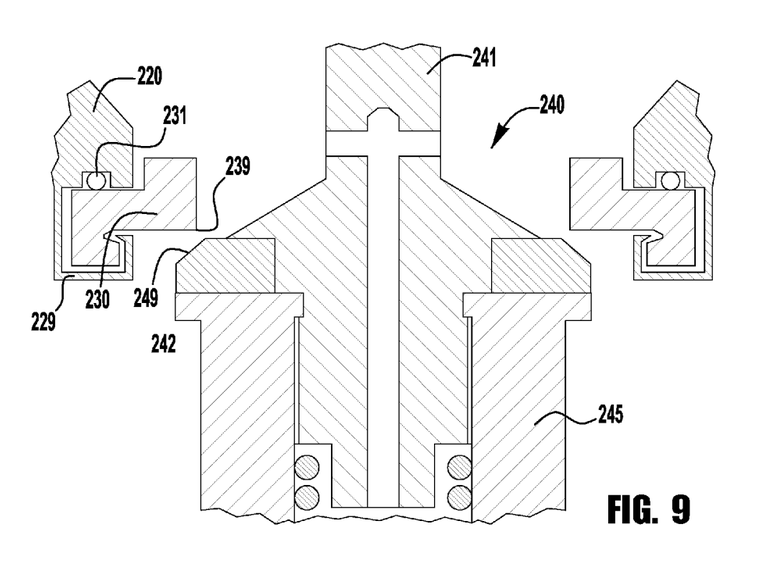
FIG. 9 is an enlarged view of a poppet sealing portion of another poppet type valve assembly, in accordance with another exemplary embodiments of the present application, shown in an open position, with deviations in sealing surface alignment exaggerated to more clearly illustrate the self-aligning properties of the poppet sealing portion.
Figure 10:
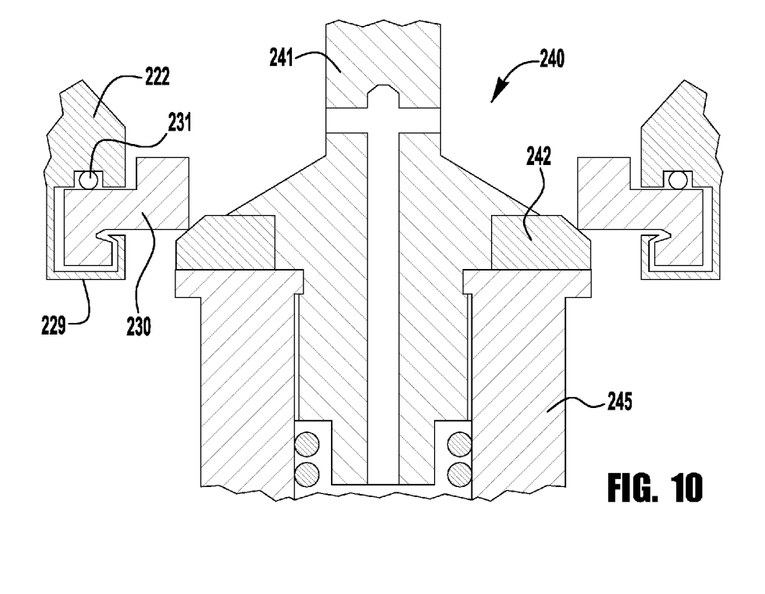
FIG. 10 is an enlarged view of the poppet sealing portion of the poppet type valve assembly of FIG. 9, shown in a closed position, with adjustment of the poppet sealing portion exaggerated to more clearly illustrate the self-aligning properties of the poppet sealing portion.

According to another inventive aspect of the present application, as shown schematically in FIGS. 9 and 10, a poppet type valve assembly may include an annular valve seat 230 that is laterally movable within a valve body 220, and a poppet 240 having a sealing portion 242 that is integral with or laterally fixed on the poppet. When the poppet 240 is moved from the open position (FIG. 9), in which a seat-seal misalignment may exist, to a closed position (FIG. 10), the axial closing force between the valve seat 230 and the sealing surface 249 of the poppet sealing member 242 is directed against the sealing surface 239 of the valve seat 230 to laterally move the valve seat for automatic alignment of the valve seat with the poppet sealing member 242. Many different types of laterally movable valve seats may be utilized. In the illustrated embodiment, the valve seat 230 is formed as an annular sealing ring loosely captured radially by a cuff or collar portion 229 on the valve body. An o-ring 231 may provide a seal between the valve seat 230 and the valve body 220. In another exemplary embodiment (not shown), a valve assembly may include a laterally movable valve seat and a laterally movable poppet sealing member, such that both the valve seat and the poppet sealing member may be laterally adjusted during valve closure for self alignment of the seat-seal engagement.

Any suitable materials may be used to provide adequate sealing performance within the valve. For example, the valve seat may be provided in stainless steel, polyetheretherketone (PEEK), or polychlorotrifluoroethene (PCTFE). The poppet sealing member may be formed from PEEK, PCTFE, ethylene propylene diene monomer (EPDM), perfluoro-elastomer (e.g., FKM or FFKM), or nitrile. The gasket/o-ring seals may be formed from EPDM, perfluoro-elastomer, or nitrile.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, hardware, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. A valve, comprising:
   a valve body comprising a fluid flow path between an inlet port and an outlet port;
   a valve seat surrounding an axially extending portion of the flow path; and
   a poppet assembled with the valve body, the poppet including an axially extending poppet stem, a poppet base assembled with the poppet stem, and a radially extending poppet sealing surface disposed between the poppet stem and the poppet base, the poppet being axially movable between a closed position in which the poppet sealing surface seals against a seating surface of the valve seat to prevent fluid flow through the longitudinally extending portion of the flow path, and an open position in which the poppet sealing surface axially separates from the valve seat to permit fluid flow through the axially extending portion of the flow path;
   wherein the poppet sealing surface is defined by an annular poppet sealing member disposed around a neck portion of the poppet stem, the poppet sealing member including first and second opposed end faces, with the poppet sealing surface extending radially outward from the first end face;
   wherein first and second ends of the poppet neck portion are defined by a first radial surface disposed on a radially outward extending rim portion of the poppet stem to face the first end face of the annular poppet sealing member, and a second radial surface disposed on the poppet base to face the second end face of the annular poppet sealing member, the first and second radial surfaces being spaced apart to define an axial gap between at least one of the first radial surface and the first end face, and the second radial surface and the second end face;
   the poppet sealing member being laterally movable on the poppet stem, wherein when the poppet is moved from the open position to the closed position, the poppet sealing member is laterally moved to align the poppet sealing surface with the seating surface, and
   further wherein one of the second radial surface and an adjacent radial surface of the poppet sealing member includes an annular groove, wherein a gasket seal is disposed in the annular groove for sealing against the other of the second radial surface and the adjacent radial surface of the poppet sealing member.

2. The valve of claim 1, wherein the annular poppet sealing member has an inner diameter that is sized to permit lateral movement of the sealing member with respect to the neck portion.

3. The valve of claim 2, wherein the annular poppet sealing member has an inner diameter sized to permit lateral movement of the poppet sealing member with respect to the neck portion between a centered position defining a concentric radial gap between the poppet stem neck portion and the poppet sealing member, and an off-center position defining an eccentric radial gap between the poppet stem neck portion and the poppet sealing member.

4. The valve of claim 3, wherein the concentric radial gap extends along an entire axial length of the annular poppet sealing member.

5. The valve of claim 2, wherein the annular poppet sealing member has a continuous circumferential profile along the inner diameter.

6. The valve of claim 2, wherein the annular poppet sealing member has a continuous circumferential profile along an outer radial surface.

7. The valve of claim 1, wherein the neck portion is sized to define an axial gap between the poppet sealing member and at least one of the first and second ends of the neck portion.

8. The valve of claim 7, wherein the axial gap permits the poppet sealing member to tilt on the poppet stem to overcome an angular misalignment between the poppet sealing surface and the seating surface.

9. The valve of claim 1, further comprising an actuator assembled with the valve body to control axial movement of the poppet between the closed position and the open position.

10. The valve of claim 9, wherein the actuator comprises a poppet driving mechanism assembled with the poppet stem and a biasing mechanism that applies a biasing force to an upper surface of the poppet driving mechanism to bias the poppet toward one of the open and closed positions.

11. The valve of claim 10, wherein the poppet biasing mechanism is configured to be biased toward the other of the open and closed positions by fluid pressure applied to a lower surface of the poppet driving mechanism.

12. The valve of claim 1, wherein the poppet sealing surface is angled such that when the poppet is moved from the open position to the closed position, an axial force applied by the valve seat against the poppet sealing surface laterally moves the poppet sealing member to align the poppet sealing surface with the seating surface.

13. The valve of claim 1, wherein the annular poppet sealing member has a minimum hardness of at least 90 SHORE D.

14. The valve of claim 1, wherein the annular groove is disposed in the second radial surface.

15. The valve of claim 1, wherein the poppet base is threadably assembled with the poppet stem, with a shoulder portion of the poppet stem abutting an upper end face of the poppet base to define a lower end of the neck portion.

16. The valve of claim 1, wherein the neck portion has an outer diameter that is uniform along an entire axial length of the neck portion, and the annular poppet sealing member has an inner diameter that is uniform along an entire axial length of the annular poppet sealing member, to allow for uniform lateral movement of the annular poppet sealing member.

* * * * *